(12) United States Patent
Debrunner et al.

(10) Patent No.: US 9,223,025 B2
(45) Date of Patent: Dec. 29, 2015

(54) UNDERWATER PLATFORM WITH LIDAR AND RELATED METHODS

(71) Applicant: LOCKHEED MARTIN CORPORATION, Bethesda, MD (US)

(72) Inventors: Christian H. Debrunner, Conifer, CO (US); Alan K. Fettinger, Highlands Ranch, CO (US); Philip A. Bouxsein, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/245,368

(22) Filed: Apr. 4, 2014

(65) Prior Publication Data

US 2015/0092178 A1   Apr. 2, 2015

Related U.S. Application Data

(60) Provisional application No. 61/808,994, filed on Apr. 5, 2013.

(51) Int. Cl.
| | |
|---|---|
| *G01S 17/89* | (2006.01) |
| *G01S 17/42* | (2006.01) |
| *G01S 7/48* | (2006.01) |
| *G01C 13/00* | (2006.01) |
| *G06T 7/00* | (2006.01) |
| *B63B 1/00* | (2006.01) |

(52) U.S. Cl.
CPC .   *G01S 17/89* (2013.01); *B63B 1/00* (2013.01); *G01C 13/008* (2013.01); *G01S 7/4808* (2013.01); *G01S 17/42* (2013.01);
(Continued)

(58) Field of Classification Search
CPC ... G01S 3/7867; G01S 7/4814; G01S 17/023; G01C 3/08

USPC ............ 356/3.01–3.15, 4.01–4.1, 5.01–5.15, 356/6–22
See application file for complete search history.

(56) References Cited

U.S. PATENT DOCUMENTS

| | | |
|---|---|---|
| 6,590,640 B1 | 7/2003 | Aiken et al. |
| 2005/0007448 A1 | 1/2005 | Kattenbacher et al. |

(Continued)

FOREIGN PATENT DOCUMENTS

| | | |
|---|---|---|
| WO | 2012/061069 | 5/2012 |
| WO | 2012/061097 | 5/2012 |

(Continued)

OTHER PUBLICATIONS

J. S. Jaffe, "Development of a Laser Line Scan LIDAR Imaging System for AUV Use," found online at www.dtic.mil/cgi-bin/GetTRDoc?ADxADA541242, believed to be published in 2010 (5 pages).

(Continued)

*Primary Examiner* — Luke Ratcliffe
(74) *Attorney, Agent, or Firm* — Hamre, Schumann, Mueller & Larson, P.C.

(57) ABSTRACT

Systems and methods for conducting autonomous underwater inspections of subsea and other underwater structures using a 3D laser mounted on an underwater platform such as AUV, an ROV or a tripod. The systems and methods described herein can be used for scanning underwater structures to gain a better understanding of the underwater structures, such as for example, for the purpose of avoiding collision of an underwater vehicle with the underwater structures and for directing inspection, repair, and manipulation of the underwater structures.

14 Claims, 17 Drawing Sheets

(52) U.S. Cl.
CPC ............ *G06T 7/0057* (2013.01); *G06T 7/0065* (2013.01); *G06T 2207/30108* (2013.01)

(56) References Cited

U.S. PATENT DOCUMENTS

| | | | |
|---|---|---|---|
| 2006/0221349 | A1 | 10/2006 | Que et al. |
| 2010/0238269 | A1* | 9/2010 | Miralles et al. .................. 348/44 |
| 2012/0044476 | A1* | 2/2012 | Earhart et al. ................ 356/4.01 |
| 2012/0062963 | A1 | 3/2012 | Gillham et al. |
| 2012/0099395 | A1* | 4/2012 | Debrunner et al. .............. 367/21 |
| 2012/0099402 | A1 | 4/2012 | Debrunner et al. |

FOREIGN PATENT DOCUMENTS

| | | |
|---|---|---|
| WO | 2012/061099 | 5/2012 |
| WO | 2012/061134 | 5/2012 |
| WO | 2012/061135 | 5/2012 |
| WO | 2012/061137 | 5/2012 |

OTHER PUBLICATIONS

C. Embry, "High Resolution 3D Laser Imaging for Inspection, Maintenance, Repair, and Operations," RPSEA Phase 1 Final Report, found online at http://www.rpsea.org/media/files/project/2fe78ba2/09121-3300-06-FR-Phase_1_High_Resolution_3D_Laser_Imaging-03-13-12_P.pdf, published Mar. 9, 2012 (48 pages).

International Search Report for international application No. PCT/US2014/032988, dated Jul. 28, 2014 (4 pages).

Written Opinion for international application No. PCT/US2014/032988, dated Jul. 28, 2014 (5 pages).

U.S. Appl. No. 14/245,522, filed Apr. 4, 2014 (43 pages).

* cited by examiner

UNDERWATER PLATFORM WITH LIDAR AND RELATED METHODS

FIELD

This disclosure relates to the use of LIDAR on an underwater platform to conduct inspections of subsea and other underwater structures. Data resulting from the LIDAR can be used for a number of purposes including, but not limited to, obtaining information about the position and orientation of an underwater vehicle relative to the underwater structure or obtaining information about whether a structural change to the underwater structure has occurred.

BACKGROUND

Systems and methods that employ 3D sonar on an underwater vehicle to conduct inspections of subsea and other underwater structures is known from WO 2012/061069, WO 2012/061097, WO 2012/061099, WO 2012/061137, WO 2012/061135, and WO 2012/061134, each of which is incorporated herein by reference in their entirety. In WO 2012/061134 and WO 2012/061135, data resulting from the 3D sonar is used to obtain information about the position and orientation of the underwater vehicle relative to the underwater structure or about whether a structural change to the underwater structure has occurred.

SUMMARY

This disclosure relates to systems and methods for conducting inspections of subsea and other underwater structures using a 3D laser. In particular, systems and methods are described that relate to autonomous underwater inspections using a 3D laser, i.e. Light Detection and Ranging (or LIDAR), also referred to as Laser Detection and Ranging (or LADAR). The terms LIDAR, LADAR and 3D laser (or the like) as used throughout this disclosure are intended to be synonymous with one another.

The systems and methods described herein are carried out using a suitable underwater platform such as a moving underwater vehicle including, but not limited to, an autonomous underwater vehicle (AUV), a remotely operated vehicles (ROVs), or a diver operated apparatus, or other underwater platform such as a tripod. So although the description below may refer specifically to an AUV, the systems and methods described herein can be employed using other types of underwater platforms, whether fixed or stationary. As used herein, an ROV is a remotely operated underwater vehicle that can be tethered by a cable to a host, such as a surface ship. The ROV is unoccupied and is operated by a pilot aboard the host. The tether can carry, for example, electrical power (in place of or to supplement battery power on the self-contained system), video and data signals back and forth between the host and the ROV. As used herein, an AUV is an autonomous underwater vehicle that is unmanned and is not tethered to a host vessel.

The systems and methods described herein can be used for scanning underwater structures to gain a better understanding of the underwater structures, such as for example, for the purpose of avoiding collision of an underwater vehicle with underwater structures and for directing inspection, repair, and manipulation of the underwater structure.

The described systems and methods can be used to scan any type of underwater structure. For example, underwater structures include man-made objects, such as offshore oil platform support structures and piers and oil-well related equipment, as well as natural objects such as underwater mountain ranges, and can include structures that are wholly or partially underwater. Underwater structure can also include both stationary and non-stationary structures, for example that may experience drift in the underwater environment. More generally, underwater structure is meant to encompass any arbitrary three dimensional structure with depth variation and that may have varying complexity.

As used herein, the teem underwater includes any type of underwater environment in which an underwater structure may be located and may need to be scanned using the systems and methods described herein, including, but not limited to, salt-water locations such as seas and oceans, and freshwater locations.

In one embodiment, a method includes directing at least laser beam pulse from a 3D laser mounted on an underwater platform toward an underwater structure, and detecting light that impinges on and is reflected from a portion of the underwater structure. Data points are obtained from the detected reflected light, with the data points being processable to provide a scanned three-dimensional virtual model of the portion of the underwater structure. The data points obtained are aligned to a pre-existing three dimensional virtual model of the underwater structure.

In one embodiment, based on the alignment, an estimation is made as to the position and orientation (i.e. the pose) of the underwater platform relative to the underwater structure.

In another embodiment, after the alignment of the data points, the scanned three-dimensional virtual model is created and compared to the pre-existing three dimensional virtual model in order to detect the occurrence of structural changes in the underwater structure.

In another embodiment, a system includes an underwater platform and a three-dimensional laser system mounted on the underwater platform. The laser system includes a steerable laser for projecting a plurality of laser beam pulses toward an underwater structure and a light detector that detects light that is reflected from the underwater structure. A point cloud data storage is in communication with the laser system for storing point cloud data generated by the laser system, and a data processor is in communication with the point cloud data storage that processes point cloud data from the data storage. The data processor is configured to (for example by executing firmware or software or other programming code) estimate a position and orientation of the underwater platform relative to the underwater structure and/or determine whether a structural change in the underwater structure has occurred.

DRAWINGS

Figure 13B:
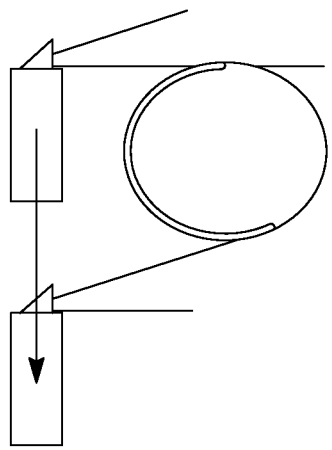
Figure 13C:
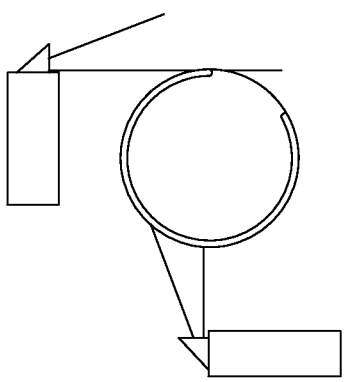
Figure 13A:
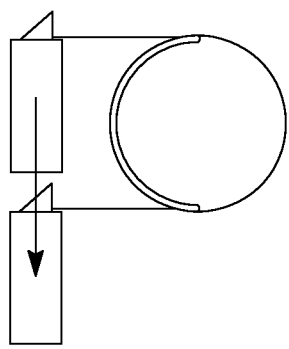

FIGS. 13A-C illustrate coverage of the laser when scanning a tubular object at various azimuths.

Figure 14:
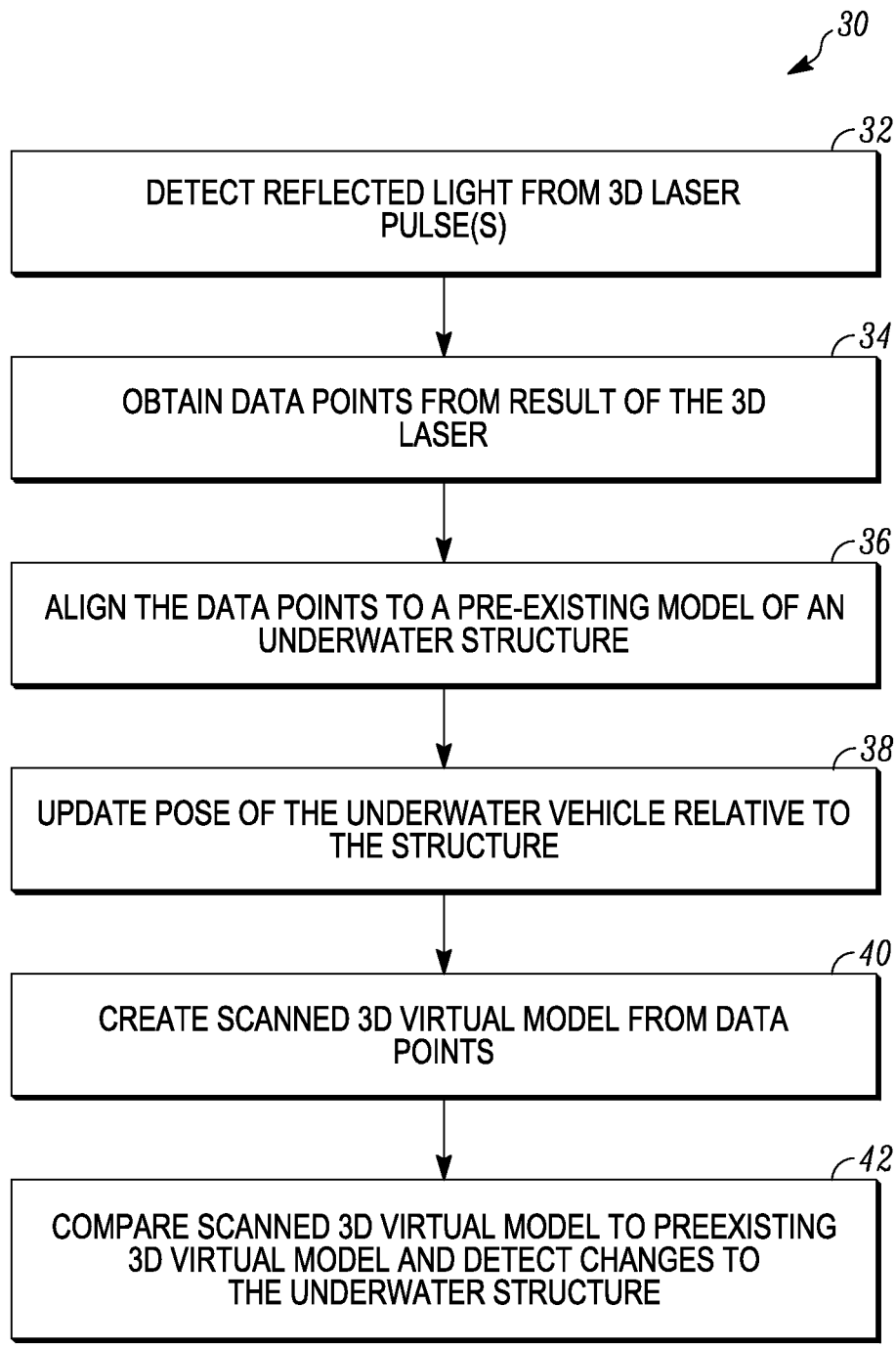

FIG. 14 is a flow diagram of an embodiment of a method to estimate pose or detect structural changes.

Figure 15:
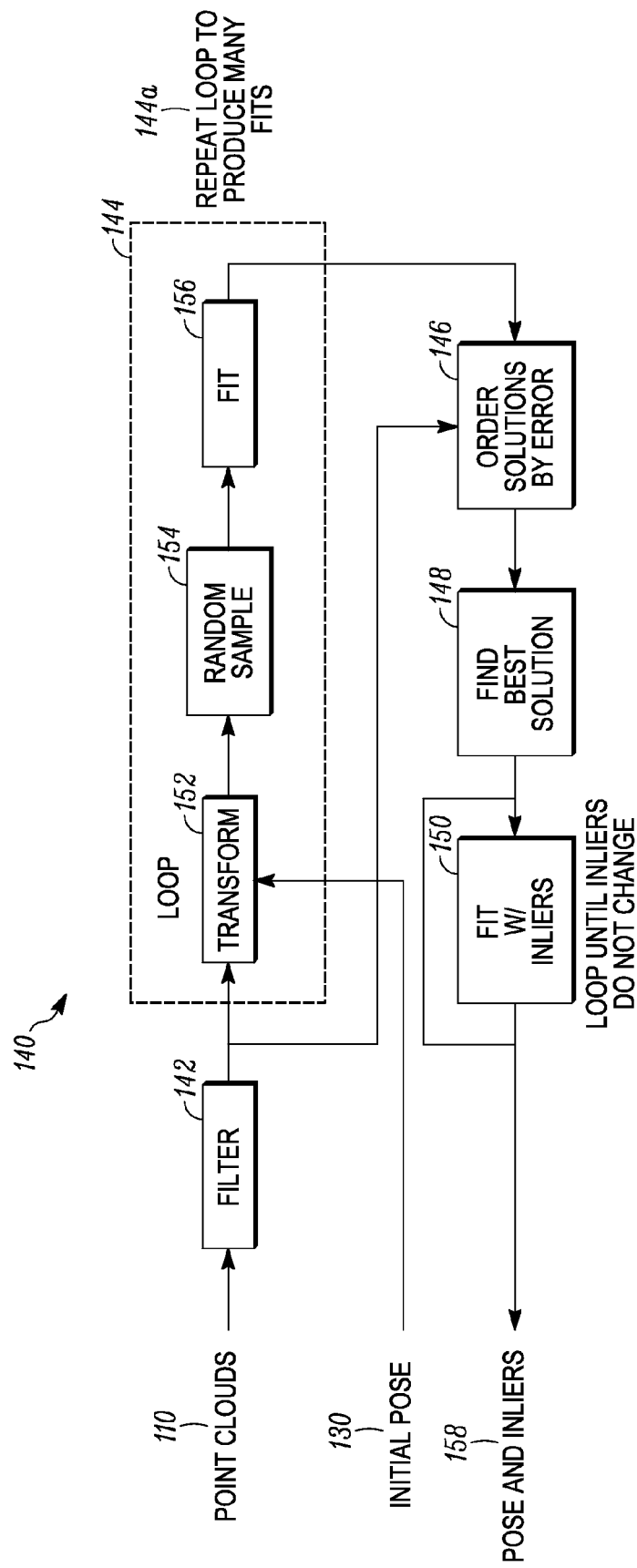

FIG. 15 is a flow diagram of an embodiment of aligning point cloud data from reflected light waves to a pre-existing model of an underwater structure which may be employed in the method of FIG. 14.

Figure 16:
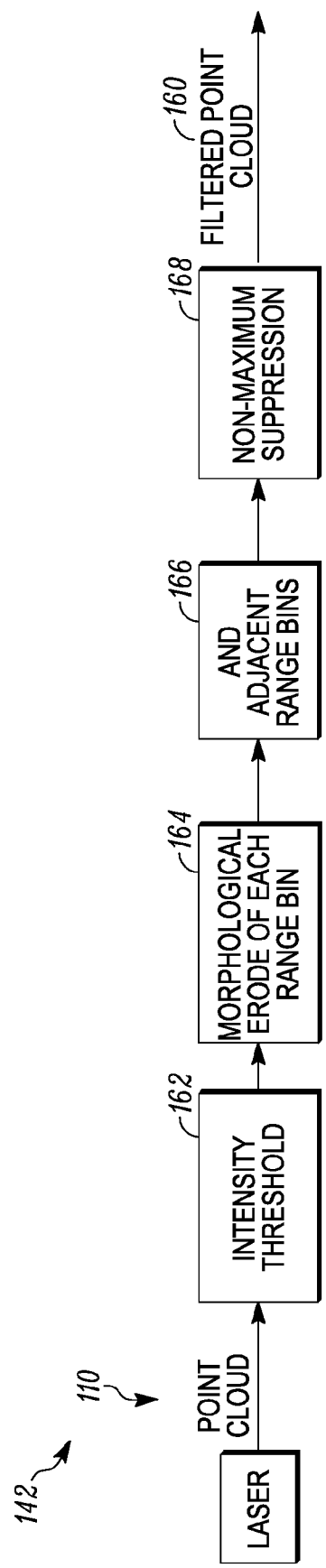

FIG. 16 is a flow diagram of an exemplary filtering process on the point cloud data which may be employed in the method of FIG. 14.

Figure 17:
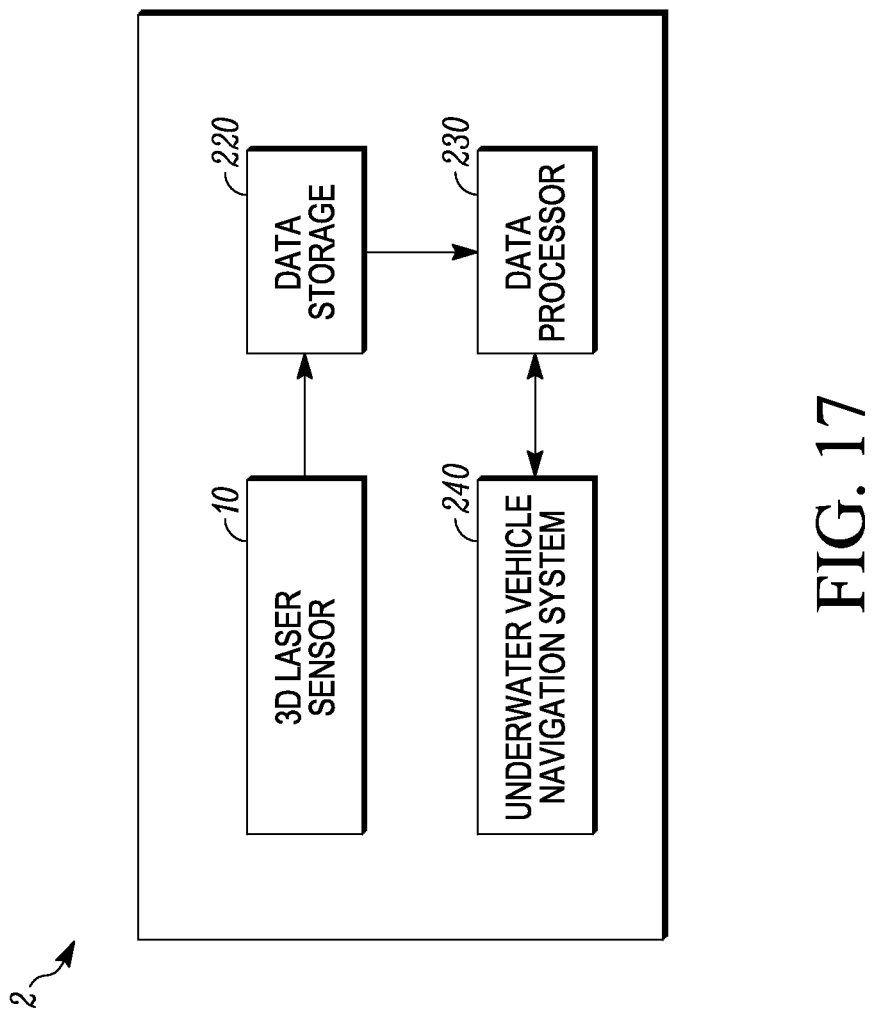

FIG. 17 is a schematic depiction of an AUV with 3D laser.

Figure 18:
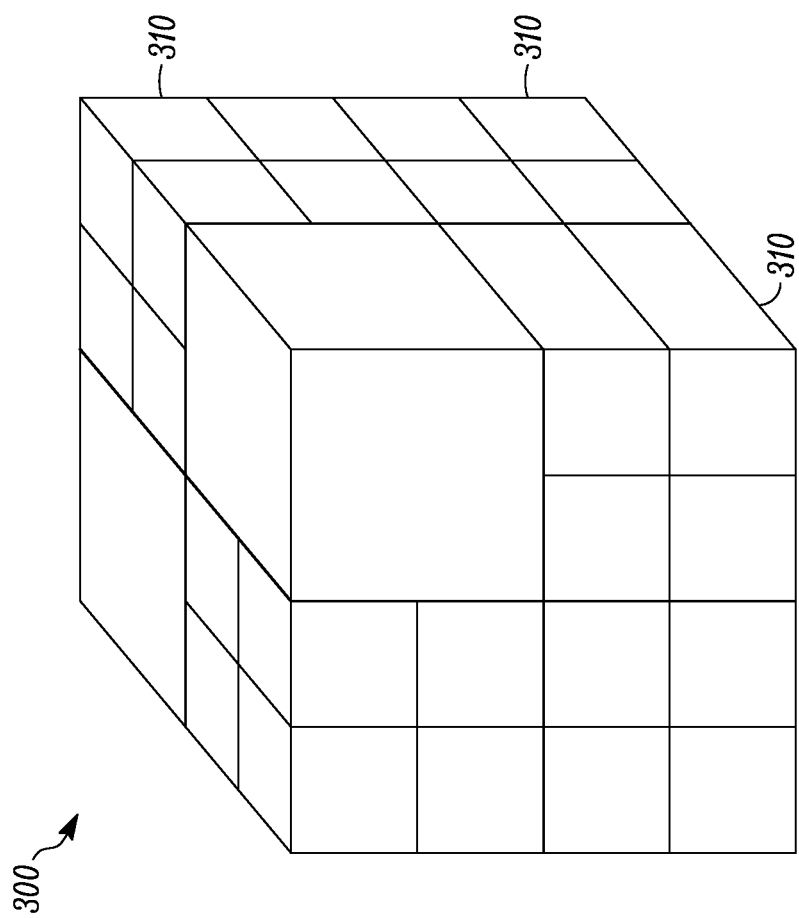

FIG. 18 illustrates an embodiment of a schematic spatial representation of cells for a change detection model which is used to compare a scanned 3D virtual model resulting from the point cloud data with a pre-existing 3D virtual model to indicate whether a structural change to an underwater structure has occurred.

Figure 19:
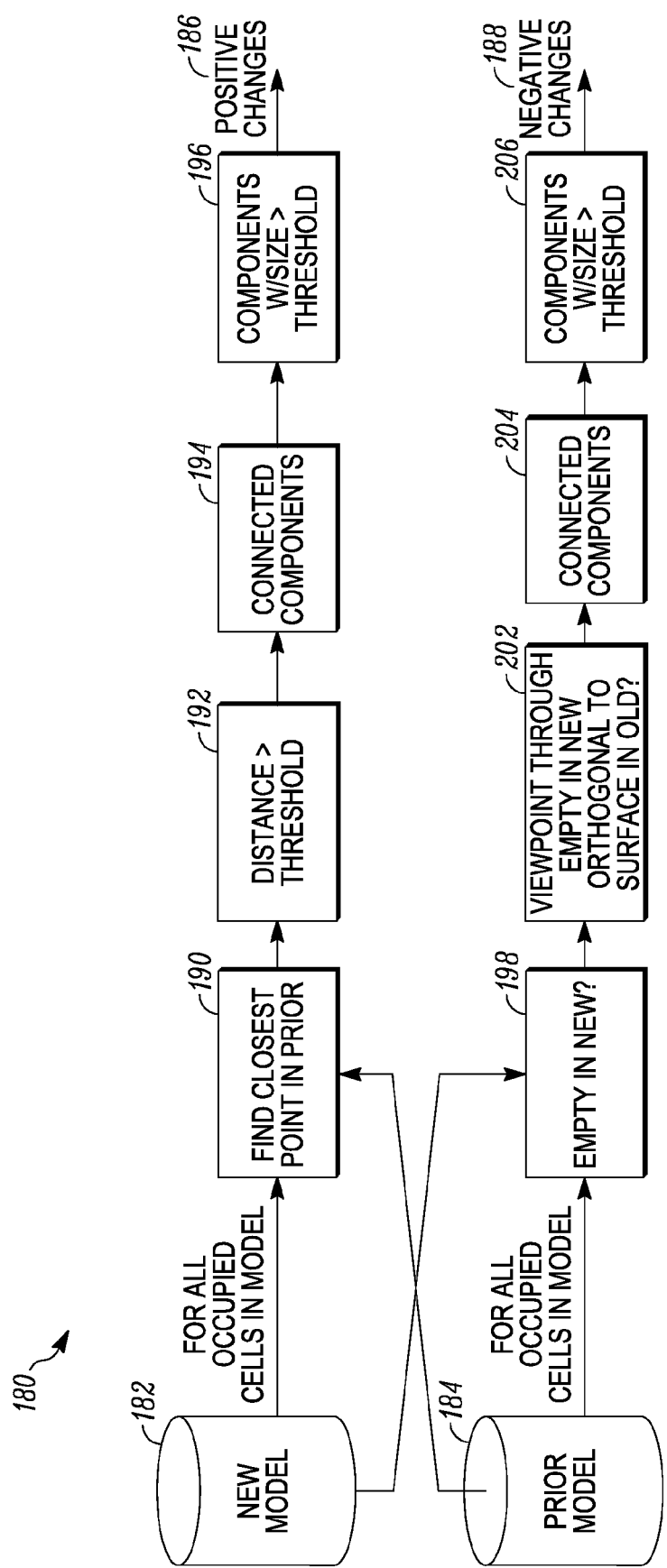

FIG. 19 is a flow diagram of an exemplary embodiment for detecting structural change of an underwater structure, which may employ the spatial representation of cells in FIG. 18.

DETAILED DESCRIPTION

Figure 1:
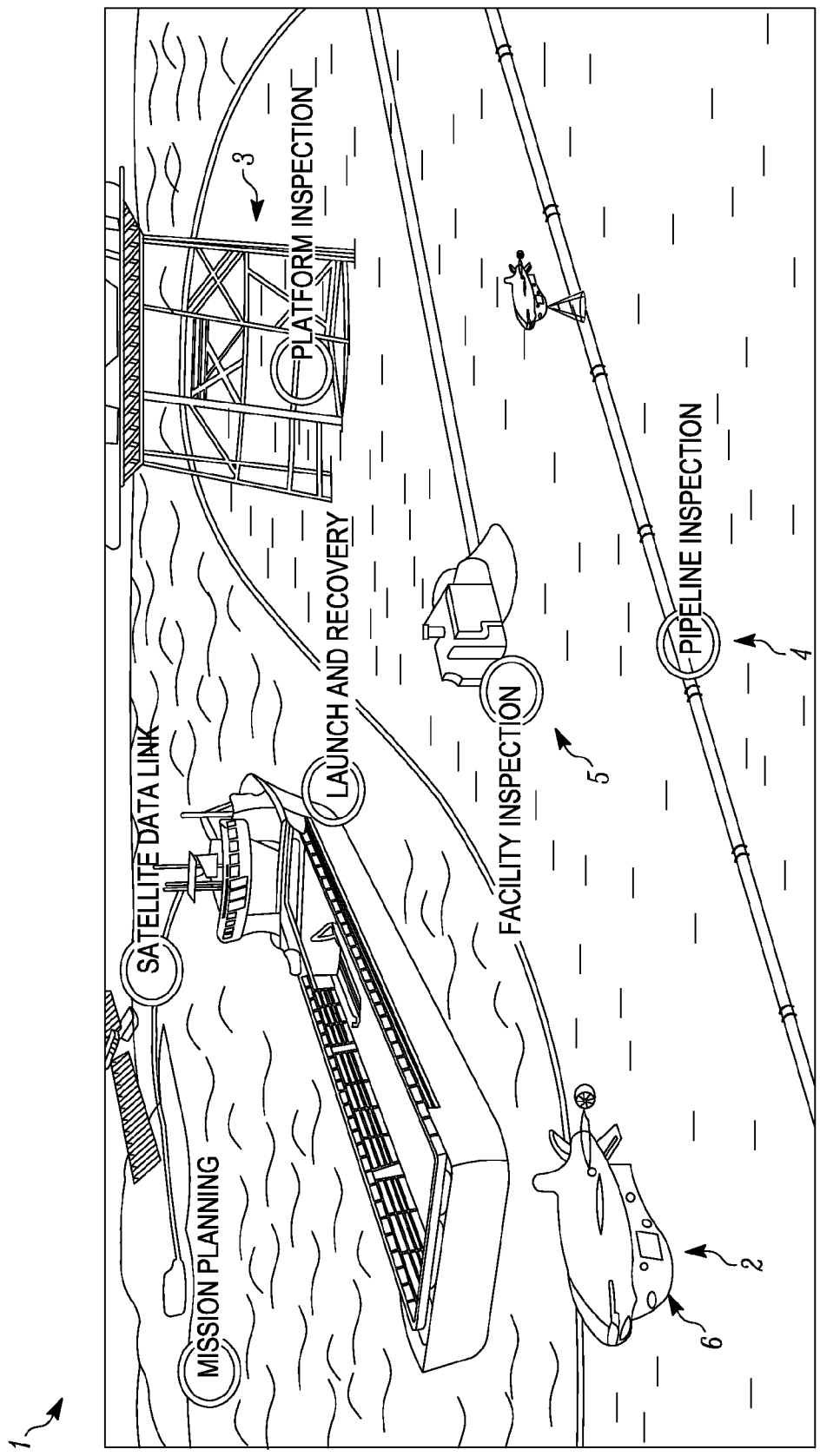
FIG. 1 illustrates an example of an AUV-based 3D laser inspection system described herein.

FIG. 1 illustrates an example of an AUV-based 3D laser inspection system 1 (also referred to as LIDAR or LADAR) where a self-propelled AUV 2 is disposed underneath the water for conducting an inspection of an underwater structure. The construction, operation and use of LADAR systems is well known in the art, including measuring the time between the projection of the laser beam and the detection of the reflection to measure range, and generating 3D virtual models using LADAR. The point clouds discussed further below are generated from the angles and times of the projected laser beam pulses, the times of the detected pulses, and the positions of the sensor reported by the vehicle navigation system.

The AUV 2 can be used to inspect any underwater structure. Examples of underwater structures include, but are not limited to, a platform support structure 3 that comprises a plurality of support legs, an underwater pipeline 4, an underwater facility 5, and other underwater structures. The AUV 2 operations can be supported by a surface ship or other non-underwater vehicle, which in turn can be in communication with a satellite which can be in communication with a land-based facility. This communication chain is exemplary only, and other communication chains can be utilized.

The AUV 2 is fitted with a pylon 6 that contains a 3D laser system for conducting 3D laser inspections of an underwater structure. The AUV 2 can be any underwater vehicle configured for conducting underwater travel and operations and that can support the 3D laser system. In one non-limiting example, an AUV with a pylon that can accommodate the 3D laser system is the Marlin® AUV available from Lockheed Martin Corporation of Bethesda, Md. The 3D laser system is not limited to being within the pylon 6 and is not limited to being located within the AUV 2. Rather, the 3D laser system can be mounted at any suitable location on the AUV 2 including on the outside of the AUV 2.

The AUV can use any suitable 3D laser system. In one non-limiting example, the 3D laser system that is used can be based on the Depth Perception 3D laser produced by 3D At Depth, LLC of Boulder, Colo. The Depth Perception 3D laser provides survey quality 3D data collection at depths up to 3000 meters. The Depth Perception laser includes a pulsed laser, laser receiver electronics (e.g. a means for detecting reflected light such as a photodector) and processing software and algorithms.

Although an AUV is described herein and shown in the illustrated embodiment, the 3D laser system can be mounted on other underwater platforms including but not limited to other self-propelled platforms such as an ROV, or non-self-propelled platforms such as a tripod.

The AUV 2 and supporting subsystems such as the surface ship and/or the land-based facility can be provided with the following functions and capabilities, singly or in any combination.

The AUV performs general 3D mapping and inspection.

The AUV performs close in inspection and measurement.

The surface ship and/or other support subsystem(s) can display the operational status of a forward looking sonar, a 3D sonar, the 3D laser and a still picture camera on the AUV.

The surface ship and/or other support subsystem(s) can allow the operator of the AUV to command operation of the 3D laser including, but not limited to, a continuous scan mode, a full scan mode, or a bowtie scan mode.

The surface ship and/or other support subsystem(s) can be capable of generating a multi-resolution model, where different sections of the model have different resolutions, depending on whether sonar, laser or a fused, optimized data set is available for that section of the model.

The AUV can be capable of statistical performance detection of positive anomalies (i.e. structures that are not expected based on a preexisting model but which appear in the generated data) not surrounded by existing structure, that are of a predetermined size or larger at a range of a predetermined distance.

The AUV can be capable of statistical performance detection of negative anomalies (i.e. structures that appear on the preexisting model but that do not appear in the generated data) not surrounded by existing structure, that are of a predetermined size or larger at a range of a predetermined distance.

The AUV can be capable of statistical performance detection of positive anomalies near existing structure of a predetermined size at a range of a predetermined distance.

The AUV can be capable of statistical performance detection of negative anomalies near existing structure of a predetermined size at a range of a predetermined distance.

Once anomalies have been identified from the 3D mapping scan, the AUV can autonomously or under command from a supporting subsystem re-plan a path to revisit these areas at a stand-off distance appropriate for the collection of high-definition optical imagery.

In one exemplary embodiment, no processing of the laser data will occur while the AUV is in the water. In this example, the raw sensor data will be stored and processed into point clouds by a supporting subsystem, for example a host surface ship or a land-based facility. The point clouds can then be post processed for model build and change detection. If real-time change detection of the laser data is desired, then real-time processing of the laser data can occur on the AUV.

The AUV can be configured to autonomously perform an inspection sortie of a subsurface structure, detecting and reporting structural anomalies and collecting detailed inspection data for analysis. Depending upon the underwater structure to be inspected, the AUV can be provided with a suitable inspection package to permit the inspection.

Figure 2:
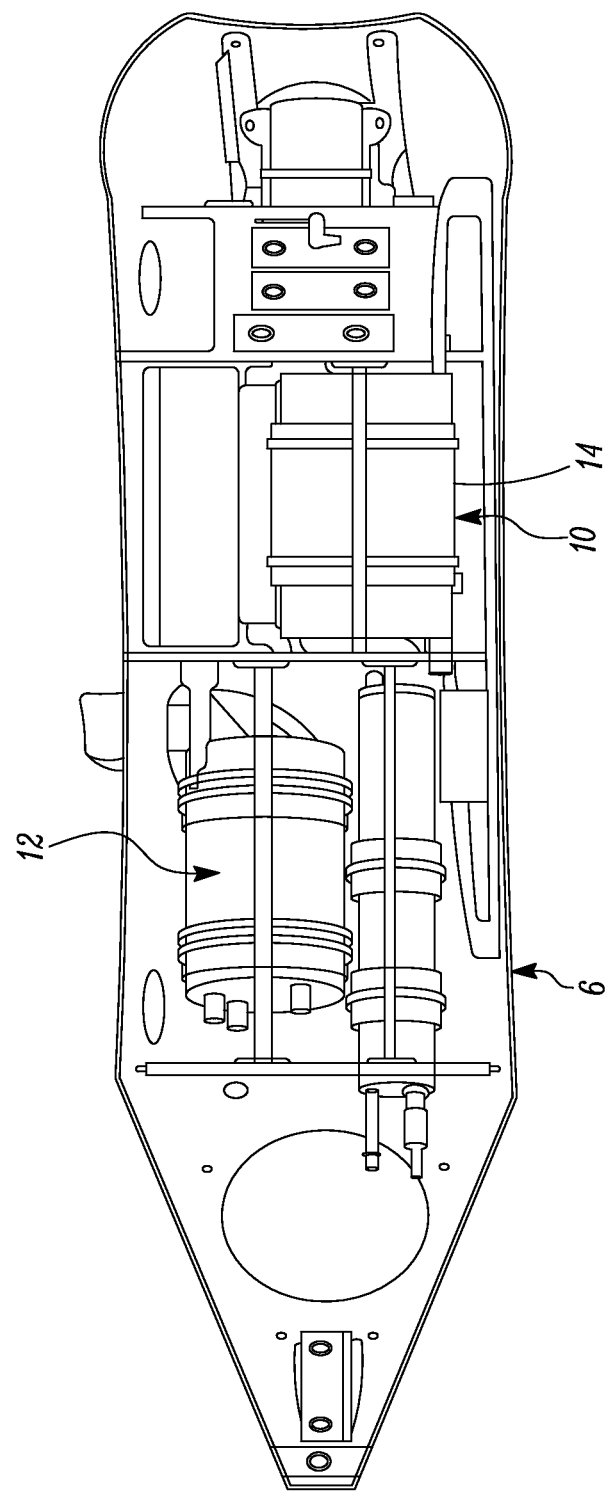
FIG. 2 is a top view of the AUV pylon removed from the AUV showing the arrangement of the 3D laser in the pylon.
Figure 3:
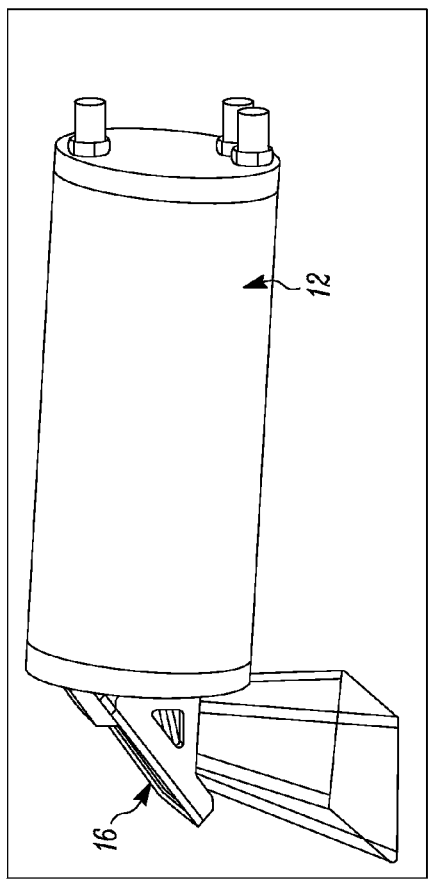
FIG. 3 shows the pressure vessel for the optics of the 3D laser.
Figure 4:
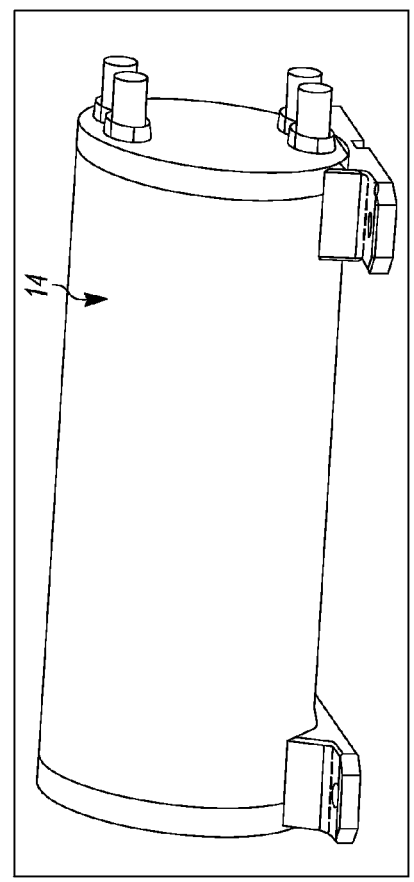
FIG. 4 shows the pressure vessel for the electronics controlling the 3D laser.

With reference to FIGS. 2-4, the pylon 6 contains the 3D laser system 10 therein. In the illustrated example, the electronics and optics of the 3D laser system 10 can be split into two separate enclosures including an optics pressure vessel enclosure 12 containing the optics for the 3D laser, including the laser emitter and the reflected light detector, and an electronics pressure vessel enclosure 14 containing the electronics for operating and controlling the laser.

Figure 5:
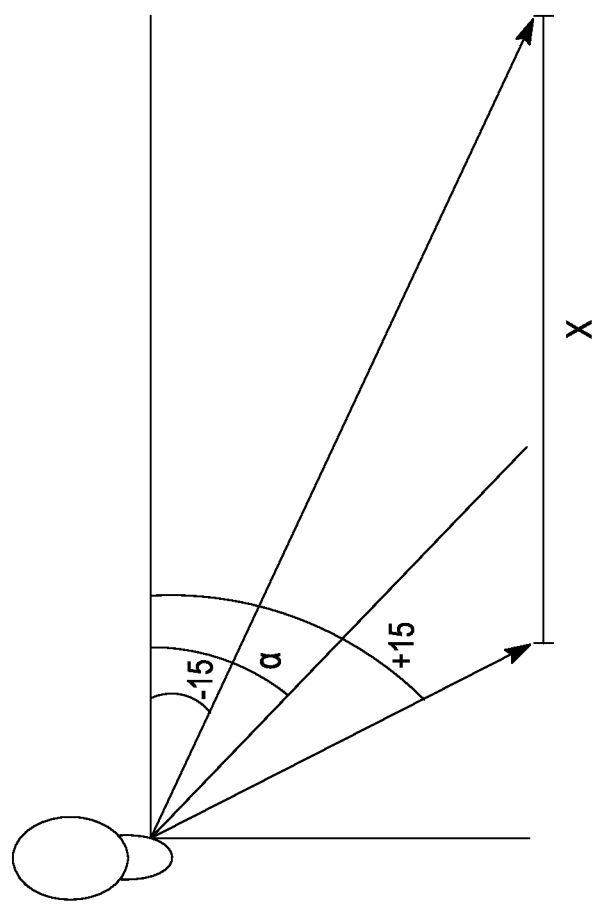
FIG. 5 is a front view of the AUV showing orientation of the 3D laser.

The laser can be mounted at any axial sensor angle per operational scenario. In one embodiment, the laser of the optics enclosure 12 can be mounted at a side look-down angle $\alpha$ of approximately 45 degrees as shown in FIG. 5. Such a side-look angle will provide good coverage of vertical and horizontal aspects of the area of interest. The laser is illustrated as being mounted so as to point portside, but it could be mounted so as to look starboard, forward, aft, downward or upward.

In one embodiment, motorized control of the laser mount angle can be provided. With reference to FIG. 3, the optics enclosure 12 contains a steerable mirror assembly 16 which provides off axis pointing of the laser beam. In one example illustrated in FIG. 5, the turn down assembly 16 can provide a vertical raster scan providing a resultant window of operation X of, for example, about ±15 degrees perpendicular to the enclosure, and, a forward raster scan of for example, about 0 to 15 degrees axial to the enclosure. Both the forward and vertical scanner operations can be fully programmable to meet varying operational modes.

In one embodiment, the 3D laser 10 can have one or more of the following:
  "side look" capability.
  an Ethernet Application Programmable Interface (API) to allow the sensor to be used as a stand-alone unit or "black box".
  up to about 300 meter depth capability
  able to be operated in Eye Safe mode
  include safety interlocks to ensure safe operation at all times.
  electrical noise shall be minimized and signal integrity maintained.
  spot coverage sufficient for varying AUV speed, range and scanner configurations.

With reference to FIG. 4, the electronics enclosure 14 provides power and communication interfaces with the AUV 2 and also interfaces with the optics enclosure 12.

The 3D laser 10 can be controlled to any suitable mode of operation including, but not limited to, the three following exemplary modes of operation:
  Continuous Scan Mode
  Bowtie Mode
  Full Scan Mode
An Ethernet Application Programming Interface (API) will allow the scanning modes to be adjusted.

Figure 6:
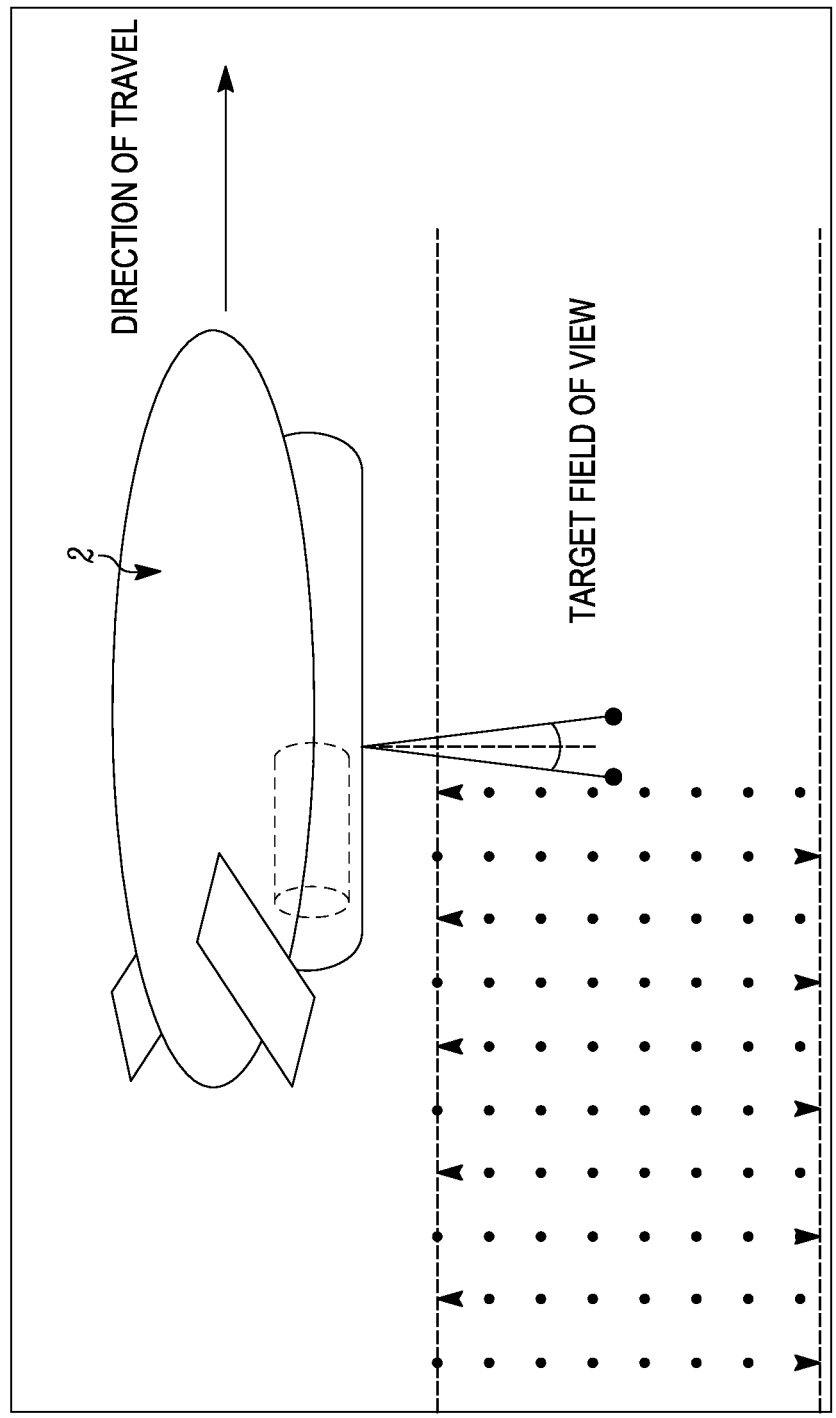
FIG. 6 illustrates operation of the 3D laser in a continuous line scan mode.

With reference to FIG. 6, the continuous scan mode provides fully programmable, line scan, vertical scanning operation utilizing the forward motion of the AUV 2. In the continuous scan mode, laser return data generated by the laser light that is reflected by the portion of the underwater structure being inspected is transferred from the electronics to the host processor after each scan line. This is referred to as re-arm time. A slight forward track correction per vertical scan line can be applied to provide a nearly vertical scan pattern to yield a more symmetric overall scan pattern. FIG. 6 illustrates the continuous scan mode for a vertical target.

Figure 7:
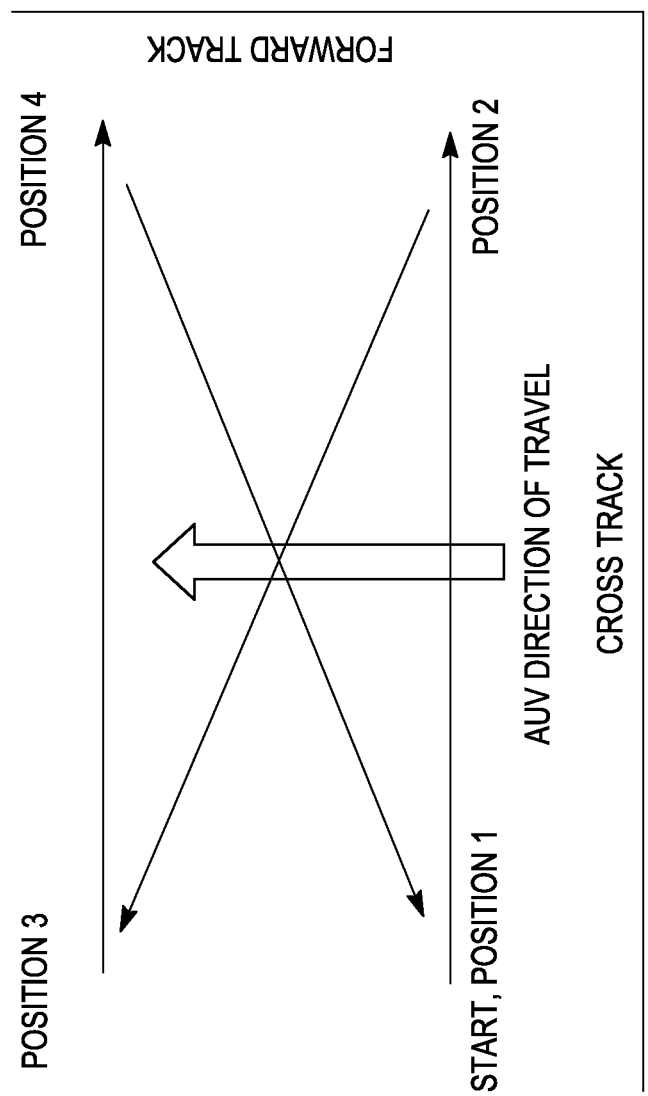
FIG. 7 illustrates operation of the 3D laser in a bowtie mode.

With reference to FIG. 7, a bowtie scan mode is illustrated that is an adaptation of the continuous scan mode. The bowtie scan mode provides fully programmable, line scan operation with interlaced forward pointing. This mode provides fast scanning and full field of view operation which is useful as a navigational aid. As depicted in FIG. 7, the laser beam is swept thru a "bowtie" pattern starting from position 1 and moving generally transverse to the direction of travel of the AUV to position 2. From position 2 the laser beam sweeps at an angle to position 3, followed by a transverse sweep from position 3 to position 4, finished by an angled sweep from position 4 back to position 1. The characteristics of the bowtie pattern can be fully programmable, and in one embodiment, each of the four sweep segments contains an equal number of laser pulses.

Figure 9:
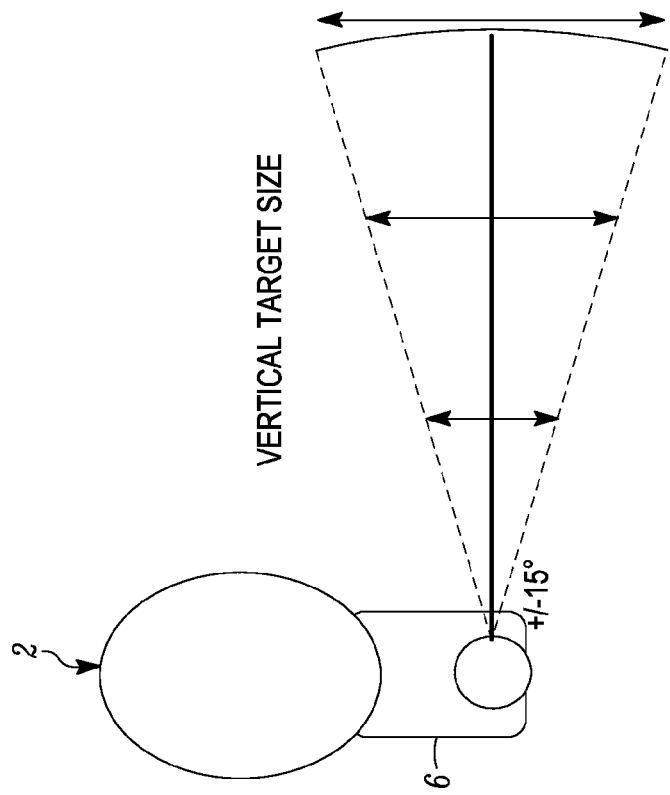
FIG. 9 is a front view of the AUV illustrating operation in the full scan mode.
Figure 8:
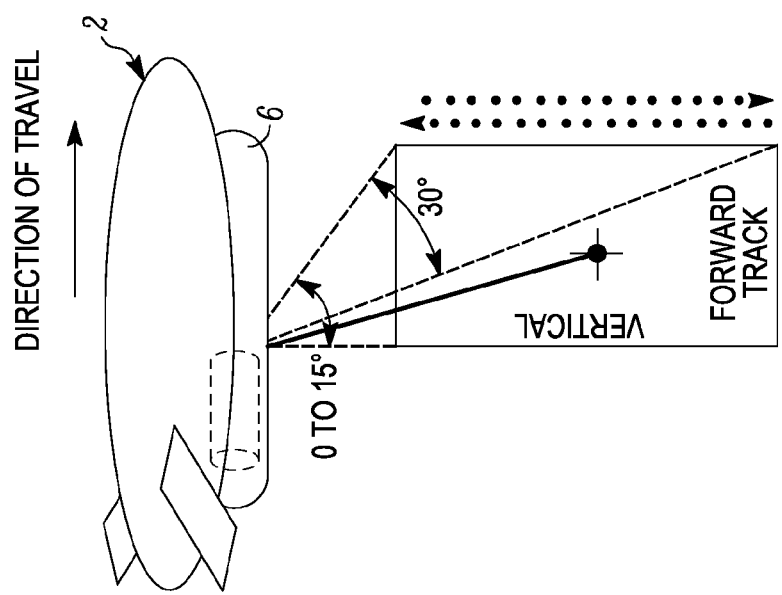
FIG. 8 is a side view of the AUV illustrating operation of the 3D laser in a full scan mode.
Figure 10:
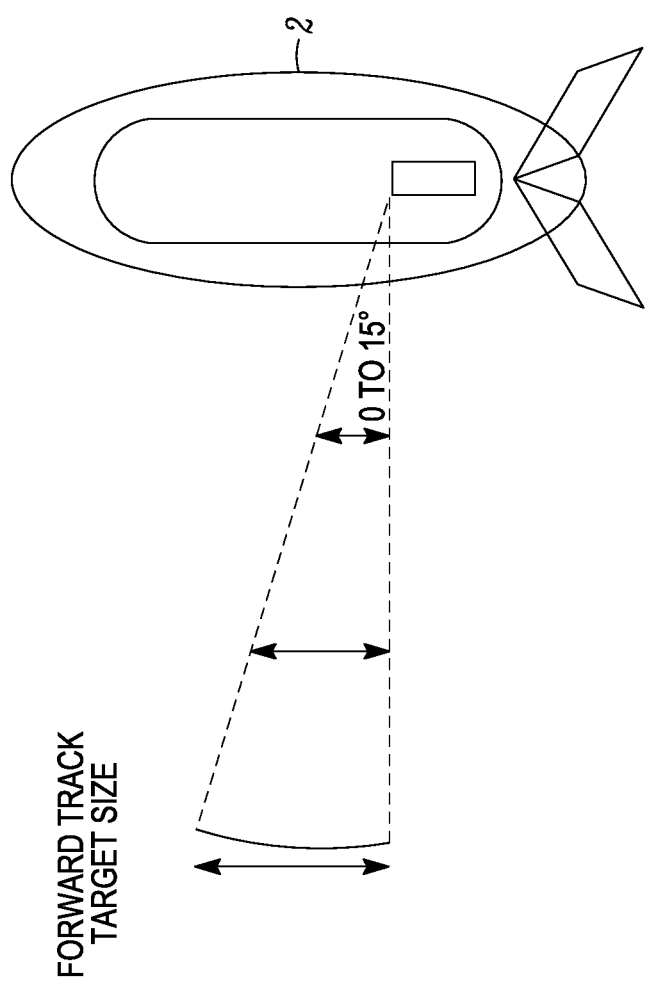
FIG. 10 is a top view of the AUV showing a forward looking view in the full scan mode.
Figure 11:
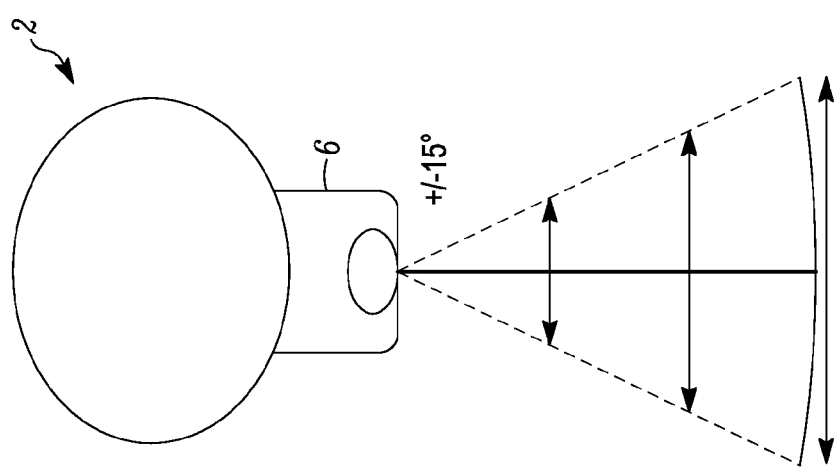
FIG. 11 is a front view of the AUV demonstrating one embodiment of an orientation for conducting a pipeline inspection.

With reference to FIGS. 8-10, a full scan mode is illustrated that functions similar to the continuous scan mode. However, in the full scan mode, the forward track angle is stepped between vertical passes to capture high detail of a given target, or to quickly capture a larger field of view. The re-arm operation occurs after the complete scan instead of after each vertical pass as in the continuous scan mode. In the full scan mode, the forward track scan angle $\theta$ can be stepped from, for example, about 0 to 15 degrees. The full scan mode is fully programmable for scan rates and forward and vertical coverage angles. Although labeled "vertical" for a side scan orientation, the raster scan motion is still considered "cross track". The laser could be mounted looking down or at a rotated orientation depending on the target of interest. In addition, motorized movement of sensor per application for immediate adjustment and target coverage can also be provided.

As indicated above, using the whole field of view of the sensor provides better coverage of the target surface. It was determined that the scan pattern had no effect on the residual point cloud error. It is preferred that the scan pattern selected should use both extremes of the field of view, provide a high data rate, and provide an even sampling of the structure at typical operating range and velocity. In order to get the highest data rate possible, downtime between scan lines should be minimized. In order to scan one side of the field of view and then the other with minimal downtime, diagonal scan lines can be used. Based on these factors it has been determined that in many instances the bowtie scan pattern may be the preferred scan pattern.

Communication packets for command and control can be sent and received from the laser 10 via, for example, the TCP/IP Ethernet Protocol. The laser can be configured with a static IP address for its network connections. The laser can provide a command acknowledge response packet for specific commands, referred to as telemetry. In addition, the laser can provide "housekeeping" telemetry packets at a regular interval to describe the current operating state of the laser. Environmental information can also be transmitted to the laser for laser range accuracy and determination of safe operating conditions for the laser. In addition, time synchronization can be employed between the AUV and the laser. Time synchronization is utilized in order to synchronize current laser pointing and range information with current position and orientation of the AUV.

Figure 12:
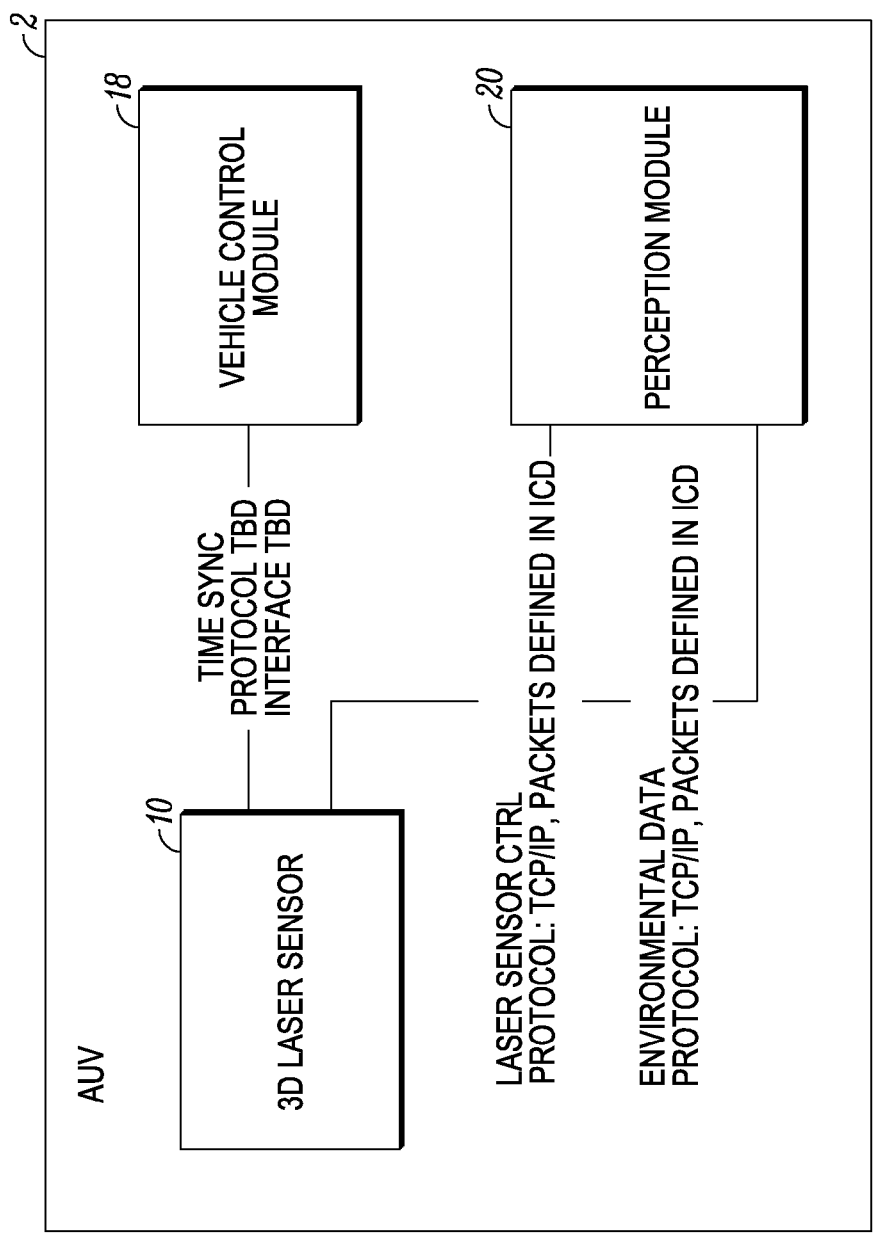
FIG. 12 illustrates exemplary interfaces between the 3D laser and other subsystems on the AUV.

FIG. 12 illustrates exemplary interfaces between the 3D laser 10 and other subsystems on the AUV. For example, time synchronization signals, laser power control, and other signals can be communicated between the laser 10 and an AUV control module 18, while laser control signals and environmental data signals can be communicated between the laser 10 and an AUV perception module 20.

The laser can communicate with the AUV modules 18, 20 through, for example, Ethernet packets. All command and telemetry packets can include a packet header and packet data. A command packet is generated on the AUV 2 and sent to the laser 10 through the TCP/IP interface. The laser will respond to all command packets with a response telemetry packet describing pass/fail status of the command.

A telemetry packet is generated on the laser 10 and sent to the AUV modules 18, 20 through the TCP/IP interface. Some telemetry packets will be issued in response to commands, and others, such as housekeeping packets, will be sent at a regular interval.

When constructing 3D virtual models, the following error sources should be minimized:
Sensor noise (azimuth, elevation, and range noise)
Salinity and temperature gradients
Time synchronization error between the 3D laser system and the AUV navigation system
Navigation errors
Calibration error
3D model representation error (can be made negligible)

Separate missions have different initial position errors due to GPS error. The difference between two missions can easily be a few meters. Alignment of the datasets to each other is required for automated change detection.

A time synchronization approach between the 3D laser system and the navigation system of the AUV can also be selected that will keep the timing error under, for example, 1 ms. Conventional time synchronization techniques can be used to achieve the synchronization.

Calibration error is the error in the measurement of the pose of the 3D laser system relative to the pose of the navigation system. To reduce calibration error, offline (dry land) and online calibration measurement approaches were compared. The online alignment approach is believed to be preferred as it eliminates any error introduced by physical misalignment after the one-time offline alignment.

With reference to FIGS. 13A-C, scanning over the full range of azimuths maximizes the area sensed. FIG. 13A illustrates the coverage area when scanning the object at a single azimuth. FIG. 13B illustrates the coverage area when scanning at a full range of azimuths. Even further coverage is provided when scanning over the full range of azimuths at the corners of the structure, as shown in FIG. 13C.

Estimating Position and Orientation of an AUV Relative to an Underwater Structure Using the AUV with LADAR In an exemplary use of the AUV 2, there is a need to be able to safely operate an AUV, ROV or other underwater vehicle around an undersea structure, particularly when the structure is not stationary. In order to safely operate an underwater vehicle near the structure, you need to know the position and orientation (pose) of the AUV relative to the structure. In addition, you need to know the pose relative to the structure to combine sensor information over time. Safe operation and combination of sensor information require this information in real time (typically under one second) in order to implement maneuver commands.

In an embodiment described herein, the 3D laser produces at least one data point for each laser pulse, with multiple data points being combined to produce a full depth virtual model of the structure. This permits estimation of the pose by aligning the data points to a stored 3D virtual model of the structure and does not require GPS, Dopier or inertial sensors. The changes in the detailed structure and noise in the 3D data complicate the alignment process due to the differences between the stored 3D virtual model and the data points produced by the 3D laser. The alignment process is further complicated by the differing horizontal and vertical spatial resolution provided by the 3D laser.

In an alternative embodiment, instead of using a 3D laser that produces at least one data point for each laser pulse, a 3D laser system that produces multiple data points from a single laser pulse, for example a flash LADAR system, could be used.

Pose estimation for underwater vehicles is currently based on inertial, Doppler Velocity Log (DVL), or reference beacons such as USBL. The methods described herein are useful in situations where navigation aids such as DVL, USBL, and LBL are either unavailable or undesirable.

Current applications of pose estimation are applied using bathymetric or 3D imaging sonar data. Those that estimate vehicle pose from a bathymetric sonar do so by matching 2.5d patches of the line scan data together. These patches are created based on navigation/pose information from inertial, GPS, or Dopier velocity sensors. This approach does not work on 3D laser data or on complex 3D structures such as oil rigs or piers with lots of depth variation. Estimating vehicle pose from 3D imaging sonar applies a similar approach, but cannot achieve accuracy of the proposed approach due to the resolution limits of the sensor.

In the case of 3D laser, since DVL or reference beacons are not required, this approach can be used far from the seafloor and without the additional hardware requirements of beacons, and because it produces pose relative to the modeled structure, it can also be used to navigate an underwater vehicle around structures that are not fixed. This technology enables AUV and ROV navigation and sensor data integration of complex rigid underwater structures in non-static conditions.

FIG. 14 shows a flow diagram of one embodiment of a method 30 for estimating position and orientation of an underwater vehicle relative to underwater structures. In general, the method is carried out by using an underwater vehicle's inertial navigation capability, the 3D laser sensor, and a processor that aligns the data points retrieved by the 3D laser sensor with a pre-existing 3D virtual model of the underwater structure. In many circumstances, this can be performed in real time, often in about one second and sometimes less. For example, the process of sending out laser pulses from the 3D laser so that they impinge on a structure of interest, detecting light 32 that is reflected by a portion of the structure to generate a data point cloud 34, filtering the data, and aligning the data points to the prior model 36 may be completed in about one second or less.

The method 30 includes directing laser pulses from a 3D laser toward an underwater structure so that they impinge on a portion of the structure. Light reflected from the structure is detected 32, generating data point clouds 34. The point clouds can be processed to generate a three dimensional virtual image. The 3D laser can be any 3D laser that can create a 3D image from the reflected light from the transmitted light pulses. An example of a suitable 3D laser is the Depth Perception 3D laser produced by 3D At Depth, LLC of Boulder, Colo. However, as indicated above, a flash LADAR system could also be used. It will be appreciated that the 3D laser can be arranged such that it points toward an underwater structure so that it can send laser pulses at the underwater structure and can be oriented at various desired angles as discussed above and distances from the underwater structure.

It will be appreciated that inertial navigation systems are known, and are used to determine the position, orientation, and velocity (e.g. direction and speed of movement) of the underwater vehicle. An inertial navigation system can include a Doppler velocity log (DVL) unit that faces downward for use in determining velocity, but it will be appreciated that an inertial navigation system can be any system that can determine position, orientation, and velocity (e.g. direction and speed of movement). An example of a suitable inertial navigation system is the SEADeVil available from Kearfott Corporation.

Once the reflected light is detected by the light sensor of the 3D laser, data points are obtained 34 which are suitable for forming a scanned 3D virtual model of the underwater structure. The data points are then aligned 36 to the pre-existing 3D virtual model of the underwater structure. By generally aligning the data points with the pre-existing 3D model, one knows what the estimated pose is relative to that portion of the structure being scanned.

With reference to the comparison step 36, in one embodiment the data points from the 3D laser are aligned with the pre-existing 3D virtual model of the underwater structure through an iterative process of fitting the data with the pre-existing 3D model. In some embodiments, this iterative process can be based on data from a single 3D laser pulse (for example in the case of a flash LADAR). In another embodiment, the iterative process is based on data from multiple 3D laser pulses. Based on the alignment, a position and orientation of an underwater vehicle relative to the underwater structure is determined and can be updated 38.

With reference to the pre-existing 3D virtual model, it is assumed that a pre-existing 3D virtual model is available for alignment to the data generated by the 3D laser. It will be appreciated that the source of the pre-existing 3D virtual model can vary. In one example, the pre-existing 3D virtual model is present at the time of initiating an estimation of position and orientation of the underwater vehicle, such as for example from an electronic file available from computer aided design software. This may be the case, for example, when a first reference model of the underwater structure is used to carry out later comparisons of the model structure. In other examples, the pre-existing 3D virtual model is available after generating the 3D virtual model of the underwater structure or updating the position and orientation, which is conducted by a first iteration of the steps 32, 34, 36, and 38. Subsequent iterations that further update the position, orientation, and model structure by matching to the virtual model of the first iteration or other earlier iteration can be used as the pre-existing 3D virtual model for subsequently received data.

That is, in some cases, at initial startup the first reference may be from an electronic file already available, and once the 3D laser has generated data, subsequent updates on the position and orientation can be used for further alignments.

With further reference to the alignment step 36, FIG. 15 shows a flow diagram of one embodiment of aligning information from the detected data to a pre-existing virtual model of an underwater structure. In the embodiment shown, aligning the data points includes aligning the data points to the pre-existing 3D virtual model of the underwater structure. As shown, aligning includes an iterative method of repeatedly performing a fit processing based on multiple samples of the data points, which is further described below, and where the fit processing includes adjusting the data points sampled to align with the pre-existing 3D virtual model of the underwater structure.

With reference to the details of FIG. 15, the 3D laser provides point clouds 110 that are used to perform the alignment process. The point clouds include data points which can be used to generate the scanned 3D virtual model of the underwater structure which is used in the change detection process discussed below. Due to a usual high level of noise and potential non-useful information that is known to occur, the data points in some circumstances are filtered 142 before undergoing alignment.

FIG. 16 shows a flow diagram of one embodiment of the filtering process 142, which may be included as part of the step of obtaining the data points 34 shown in FIG. 14. The filtering process 142 includes filtering the detected light resulting from the laser light pulses impinging on the underwater structure, so as to obtain data points that are used during alignment. The data from the point cloud 110 are input through a series of data processing and filtering steps, which result in a filtered point cloud 160. In the embodiment shown, the point cloud 110 is input to an Intensity Threshold filter 162. Generally, the filtering process 142 can perform morphological operations on the point cloud 110. For example, a Morphological Erode of Each Range Bin 164 can be performed, and then Adjacent Range Bins 166 can be combined. Box 164 and 166 represent non-limiting examples of certain morphological operations that can be used in the filtering process 142. Next, a Non-maximum Suppression 168 step can be performed before the filtered point cloud 160 is obtained.

With further reference to FIG. 15, the filtered point cloud 160 proceeds to a processing loop 144. In one embodiment, the processing loop 144 can be a RANSAC (random sample consensus) loop which is an iterative method to estimate parameters of a mathematical model from a set of observed data which contains "outliers". For example, the loop 144 represents a non-deterministic algorithm in the sense that it produces a reasonable result with a certain probability, and where the probability can increase as more iterations are performed. In this case, the parameters of the mathematical model are the position and orientation (pose) of the 3D laser relative to the pre-existing virtual model of the underwater structure, and the observed data are the data points from the laser. A basic assumption is that the observed data consists of "inliers", i.e., data that can be explained by the mathematical model with some pose parameters, and "outliers" which are data that cannot be thus explained. As a pre-existing 3D model is available in the method herein, such an iterative process, given a small set of inliers can be used to estimate the parameters of a pose by computing a pose that fits the data (i.e. 3D laser data points) optimally to their corresponding closest model points.

As shown in FIG. 15, the processing loop 144 can include processing functions Transform 152, Random Sample 154, and Fit 156. In the Transform 152 portion, the point clouds undergo transformation to a coordinate system specified by the initial pose 130 that brings them into approximate alignment with the pre-existing 3D virtual model.

As further shown in FIG. 15, an initial pose 130 is input into the Transform 152 portion. In some instances, the initial pose 130 represents the position and orientation from an underwater vehicle's inertial navigation system. In subsequent iterations, the initial pose can be the result from updated knowledge of the first or any preceding alignment that has occurred, while undergoing the procedure shown by FIG. 15. It will be appreciated that a preceding alignment can be appropriately adjusted based on other measurements, such as inertial velocity or acceleration and other inputs from the underwater vehicle's inertial navigation system.

With reference to the available pre-existing 3D virtual model, the pre-existing 3D virtual model can be input at steps 146, 156 and 150, and further described as follows.

In the Random Sample 154 portion of the loop 144, a sample of the points from the point cloud is obtained for further processing and alignment with the pre-existing 3D model. The Fit 156 portion of the loop 144 is where the points sampled from Random Sample 154 are adjusted to line up with the pre-existing 3D model. That is, the collective position (pose) of the 3D laser data, e.g. data points, is rigidly adjusted to align the points with the pre-existing 3D model. In the Fit 156 portion, the data points can undergo one or more closest point calculations to determine the closest point on the model. The data points and the closest point on the model for each data point are used to compute the correction to the initial pose 130 that optimally aligns the data points and closest points on the model for each data point.

As described, the alignment process is an iterative method to determine a correction to the initial pose 130 that aligns as many points of the data as possible (the inliers) with the pre-existing 3D virtual model. In some embodiments, data points resulting from multiple laser pulses of the 3D laser may be employed as needed. In other embodiment, data points from a single laser pulse from the 3D laser can be used.

Thus, it will be appreciated that the functions Transform 152, Random Sample 154, and Fit 156 are configured as a loop 144 that can be repeated 144*a* as necessary to raise the confidence that the best alignment of the data with the pre-existing 3D virtual model found in these iterations is truly the best possible alignment. The step of aligning in many embodiments includes repeatedly performing a fit processing based on multiple samples of the data points, where the fit processing includes adjusting the data points sampled to align with the pre-existing 3D virtual model of the underwater structure. It will be appreciated that in appropriate circumstances, the data point samples that go through the loop 144*a* can often have overlapping data points, where such overlap can further help increase the probability of finding the best possible alignment of the data points with the model.

That is, the fit can be performed using a subsample of the data points. Fit uses these points to estimate the pose of the sensor relative to the virtual model. This estimated transform is applied to all data points. The transformed points are then aligned to the pre-existing virtual model to determine how well the data matches.

It will also be appreciated that the number of iterations that is appropriate and the amount of overlap used to carry out the alignment and fit can depend upon a balance of several factors. Some factors can include, but are not limited to for example, the amount of processing power employed, how much time is used to collect data, reliability of the data collected and the pre-existing virtual model available, how the underwater vehicle is moving, and the complexity of the underwater structure. Where more than one 3D laser pulse is employed, other factors such as for example, the pulse rate of the 3D laser, the potential increase in the initial pose 130 error over time, and the accuracy of the virtual model can be considered in determining how many iterations of the alignment process are needed.

After many random samples of data points have been fitted, a number of solutions can be obtained. FIG. 15 shows portions Order Solutions by Error 146 and Find Best Solution 148. The solutions provided by the loop 144*a* are ordered (e.g. at 146) so that the best solution can be obtained (e.g. at 148). Once the best solution is obtained, the closest points on the pre-existing 3D virtual model to each of the inliers of this solution are determined, and the correction to the initial pose that best aligns these inliers with the closest points is computed at Fit w/Inliers 150. The updated pose is sent, for example, back to the underwater vehicle's inertial navigation system.

The data processing described herein can be perfoinied in real time on the AUV while the AUV is navigating near the structure.

FIG. 17 schematically depicts an example configuration of the AUV 2 for carrying out the pose estimation. In one embodiment, the AUV includes the 3D laser sensor 10 and an inertial navigation system, along with suitable processing capability to carry out the estimation of position and orientation. This combination of features permits the system to be used to, for example, navigate an underwater vehicle relative to underwater structures.

In the embodiment shown, the 3D laser sensor 10 detects light that is reflected by the Underwater structure of interest, and transmits gathered data to a data storage 220. A data processor 230 is configured to obtain the data points from the data storage 220. The data processor 230 can be, for example, any suitable processing unit. In an embodiment discussed further below, the data points can be processed to generate a scanned 3D virtual model of the underwater structure for the purpose of change detection. The processor 230 is configured to align the data points to the pre-existing 3D virtual model of the underwater structure. Based on the alignment, the processor 230 is configured to determine a position and orientation of the AUV relative to the underwater structure. The position and orientation can be used to update the underwater vehicle navigation system 240 which is, for example, an inertial navigation system. It will be appreciated that the components can be powered by the AUV 2.

The methods and systems described herein above can be used to navigate an underwater vehicle relative to an underwater structure based on features of the underwater structure from the 3D laser scans. In one embodiment, data from the 3D laser scans is collected, data from inertial navigation is collected, and the data is logged and processed to align the data with a pre-existing 3D virtual model of the underwater structure. The collection, logging and processing of the data can be performed using the data processing electronics onboard the AUV.

Change Detection of an Underwater Structure in Real-Time Using the AUV Configured with LADAR In another exemplary use of the AUV 2, there is a need to be able to inspect an undersea structure for changes, damage, or deformation using an underwater vehicle such as an AUV or an ROV. The inspection is particularly difficult when the structure is not stationary. For efficient operation, processing for such an inspection can be performed in real time (typically under one second) on the ROV or AUV since communications with the surface often have limited or no bandwidth. Often, inspection of the structure is routine and periodic, but sometimes they are also urgent, e.g., post-hurricane damage inspection or damage control emergency inspection. In other embodiments, processing can be performed remote from the AUV 2, for example on a host surface ship or on-shore facility.

The described approach keeps track, in real time, of the regions of space that have been imaged and those that have not, and, among those that have been imaged, identifies regions of the structure that have changed. Current state of the art does not apply to complex underwater 3D structures with many occlusions. Current applications of change detection use bathymetric sonars and are not processed in real time and do not apply to complex underwater structures. Existing approaches encounter difficulties when the object is imaged from a different viewpoint than in earlier collections since they cannot distinguish between structure that was previously occluded and structure that has changed.

The described technique allows the change detection method to determine if an apparent change arises because the object was occluded in the current or previous LADAR data. This permits rapid and autonomous determination of which portions of the structure have not been imaged. The described modeling approach permits efficient combining of the LADAR data from many viewpoints to reliably determine which returns are artifacts and which arise from real structure.

Returning again to FIG. 14, the method for detecting structural changes in underwater structures is substantially similar to the pose estimation method described above. In general, the method is carried out by using the AUV's inertial navigation capability along with the 3D laser sensor, and a processor that compares the data retrieved by the sensor against the pre-existing 3D virtual model of the underwater structure. In many circumstances, this can be performed onboard the AUV and in real time, often at about one second and sometimes less, but the processing can be done off board the AUV, for example after the AUV completes is inspection mission.

Like the pose estimation method 30, the change detection method includes directing one or more laser pulses toward an underwater structure so that they impinge on a portion of the structure. Light reflected from the structure is detected 32, generating data point clouds 34 which can be aligned to the pre-existing 3D virtual model. At least one of the point clouds are then processed to generate a scanned 3D virtual model which is then compared to the pre-existing 3D virtual model to detect changes.

The 3D laser can be any 3D laser that can creates a 3D image from the reflected light from transmitted light pulse(s). An example of a suitable 3D laser is the Depth Perception 3D laser produced by 3D At Depth, LLC of Boulder, Colo. Another example of a suitable 3D laser is a flash LADAR. It will be appreciated that the 3D laser can be arranged such that it points toward an underwater structure so that it can send laser pulses at the underwater structure and can be oriented at various desired angles as discussed above and distances from the underwater structure.

It will be appreciated that inertial navigation systems are known, and are used to determine the position, orientation, and velocity (e.g. direction and speed of movement) of the underwater vehicle. An inertial navigation system can include a Doppler velocity log (DVL) unit that faces downward for use in determining velocity, but it will be appreciated that an inertial navigation system can be any system that can determine position, orientation, and velocity (e.g. direction and speed of movement). An example of a suitable inertial navigation system is the SEADeVil available from Kearfott Corporation.

Once the reflected light is detected by the light detector of the 3D laser, the data points are obtained 34 which are suitable for forming the scanned 3D model of the underwater structure. The data points can be aligned 36 to the pre-existing 3D virtual model of the underwater structure as discussed above to determine pose.

In addition, for change detection, a scanned 3D virtual model is generated 40 from at least one, for example all, of the prior generated point clouds. The scanned 3D virtual model is then compared 42 to the pre-existing 3D model data to determine whether the scanned structure has changed.

With reference to FIGS. 18 and 19, the data point clouds used in the alignment processes above are further processed to determine whether structural changes have occurred in the underwater structure (e.g. change detection).

The data points used during alignment are used to generate the scanned 3D virtual model which is used to compare to the pre-existing 3D virtual model of the underwater structure. Based on the comparison, structural changes in the underwater structure can be detected.

FIG. 18 shows a schematic spatial representation of cells 300 for a change detection model. Comparisons can be made to the model against new data received, where such a comparison(s) indicate whether a structural change to the underwater structure has occurred. The spatial representation of the cells 300 is shown, where each cell 310 is decomposed with several child nodes 310. FIG. 18 is an exemplary illustration of how an octree may be used to represent a cubic volume of space. The 'model' is actually data that is stored in each of the cells of the octree. As shown, some of the cells are decomposed into eight child nodes 310. It will be appreciated that not every cell need be decomposed or subdivided, which in appropriate circumstances can allow for a more compact model. Cells are only subdivided in regions of the model that require the smaller, child cells to improve the fidelity of the model.

As described, the spatial representation of FIG. 18 is known as an octree. An octree is a tree data structure in which each internal cell or node has exactly zero or eight children. Octrees can be useful to partition a three dimensional space by recursively subdividing it into eight octants. It will be appreciated that other spatial representations may be possible and that while octrees are known to be suitable for this process, there is no limitation that an octree must be employed.

With further reference to FIG. 18, as the scanned 3D virtual model is generated, each cell contains information about laser hits or occupied space, laser pass-throughs or empty space, as well as areas of that are unknown. Each cell may contain the second order moment of the laser hits, the laser pass-throughs, or the second moments of laser pass-throughs. It will be appreciated that octrees, the aggregation of data in octrees, and second order moments are standard concepts that one of skill in the art would understand. For example, when a laser hit is recorded in a cell, that information is added to the second order moments model in that particular cell. Likewise, when a laser beam passes through a cell, that information is recorded in laser pass-throughs and the viewpoint diversity model in that cell. Such information is used together to determine whether the node should be considered empty, occupied, or unknown (e.g. not enough information).

The use of the octree in FIG. 18 allows for generation of the scanned 3D model by collecting information about occupied space where structure is present, collecting information about unoccupied space where structure is not present, and identifying unknown space where there is not sufficient information to determine whether the structure is or is not present. In appropriate circumstances, the scanned 3D model is based on the input of multiple aligned samples. Each sample represents data collected from a different viewpoint of an area inspected, such that as more viewpoints are used, the confidence that structure exists (or does not exist) becomes higher. This higher confidence represents a higher probability that the change detection model has been created with accuracy.

It will also be appreciated that, in addition to obtaining information from several viewpoints, the number of times each empty cell and occupied cell is sensed by the laser sensor may also be tracked and counted, which can further increase the confidence of the model generated.

After building a new scanned 3D virtual model, FIG. 19 illustrates a flow diagram that shows one embodiment for detecting structural change 180 of an underwater structure, for example, using the scanned 3D virtual model of FIG. 18.

As shown, both positive changes 186 and negative changes 188 can be determined from using both a new scanned 3D model 182 (new model) generated for the underwater structure and the pre-existing model 184 (prior model) of the underwater structure. As used herein, positive changes are newly detected structure that was not present in the prior model. As used herein, negative changes are missing structure in the new model that was present in the previous model.

In the embodiment shown, positive changes are determined by both inputs of the new model 182 and the prior model 184. Data from occupied cells in the new model 182 are input for further processing along with the prior model 184. Further processing occurs for comparing the occupied cells from the new model 182 and the prior model 184. The closest point is found for the occupied cells of the new model 182 relative to the prior model. Occupied cells whose distance to the closest point in the prior model is greater than a threshold are removed 192, and connected components in the remaining occupied cells are computed 194. The occupied cells contained in connected components of size above a threshold 196 are output as positive change(s) 186.

In the embodiment shown, negative changes 188 are determined by both inputs of the new model 182 and the prior model 184. Occupied cells in the prior model 184 are input for further processing with the new model 182. Further processing occurs for comparing the data from the new model 182 and the prior model 184. Occupied cells of the prior model 184 that are not empty in the new model 182 are removed 198. As shown, remaining occupied cells are removed if in the viewpoint directions in the empty cell in the new model are orthogonal to the model surface in the prior model 202. Connected components of the remaining occupied cells are computed 204 and cells in connected components larger than a threshold 206 are output as negative change(s) 188.

As shown by FIG. 19, the method for change detection 180 reliably finds both positive and negative changes by recording what was sensed and what was not sensed in both the prior model and the new model. For example, it distinguishes between a surface in the new scanned model that was not seen in the prior model and a surface in the new model that was not there in the prior model (e.g. positive changes). Also, the method herein can distinguish between a model surface missing in the new model because it was not sensed in the prior model and model surface missing in the new model because it is no longer present (e.g. negative changes). Further, by recording the number of times a cell 310 is sensed as empty and the diversity of viewpoints from which it is sensed as empty, the method reduces the impact of noise and artifacts.

The AUV 2 illustrated in FIG. 17 can be used for detecting the structural changes.

The methods and systems described herein above can be used to detect structural changes to underwater structures based on features of the underwater structure from the 3D laser scans. Such applications can include but are not limited to subsea structure inspection both commercial and military, harbor inspection, and mine detection/countermeasures. In one embodiment, data from the 3D laser scans is collected, data from inertial navigation is collected, and the data is logged and processed to compare the 3D image of the scanned underwater structure with the pre-existing 3D model of the underwater structure. The collection, logging and processing of the data can be performed using the data processing electronics onboard the underwater vehicle, with real time processing capability.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method comprising:
   directing at least one laser beam pulse from a laser that is mounted on a moving underwater vehicle toward an underwater structure while the vehicle is at a first location relative to the underwater structure;
   detecting light that is reflected from the underwater structure using a light detector mounted on the underwater vehicle;
   generating at least one data point cloud from the detected light autonomously in real time, each data point cloud being suitable for generating a scanned three-dimensional virtual model of the underwater structure;
   aligning data points in at least one of the data point clouds to a pre-existing three dimensional virtual model of the underwater structure autonomously in real time; and
   while aligning the data points in at least one of the data point clouds to a pre-existing three dimensional virtual model of the underwater structure autonomously in real time, moving the underwater vehicle from the first location to a second location relative to the underwater structure.

2. The method of claim 1, based on the alignment, estimating a position and orientation of the underwater vehicle relative to the underwater structure autonomously in real time.

3. The method of claim 1, further comprising creating a scanned three-dimensional virtual model from at least one of the data point clouds autonomously in real time, comparing the scanned three-dimensional virtual model to the pre-existing three dimensional virtual model autonomously in real time, and determining whether a structural change in the underwater structure has occurred autonomously in real time.

4. The method of claim 1, further comprising directing a plurality of laser beam pulses from the laser toward the underwater structure autonomously in real time, and for each laser beam pulse detecting light that is reflected from the underwater structure using the detector mounted on the underwater platform autonomously in real time.

5. The method of claim 1, wherein the moving underwater vehicle is one of an autonomous underwater vehicle, or a remotely operated underwater vehicle.

6. The method of claim 1, further comprising filtering the data point cloud autonomously in real time.

7. The method of claim 1, wherein aligning the data points comprises performing autonomously in real time an iterative fit process using data points from a plurality of the laser beam pulses, the iterative fit process comprises autonomously in real time adjusting the data points that align with the pre-existing three dimensional virtual model of the underwater structure.

8. The method of claim 1, comprising autonomously in real time updating the pre-existing three dimensional virtual model after aligning the data points.

9. The method of claim 3, wherein creating the scanned three-dimensional virtual model includes autonomously in real time: collecting information about occupied space where structure is present, collecting information about unoccupied space where structure is not present, and identifying unknown space where information has not been collected.

10. The method of claim 9, wherein creating the scanned three-dimensional virtual model comprises autonomously in real time inputting multiple aligned data samples, each aligned data sample represents data collected from a different viewpoint of an area of the underwater structure.

11. A system, comprising:
a moving underwater vehicle and a three-dimensional laser system mounted on the moving underwater vehicle, the laser system including a steerable laser for projecting a plurality of laser beam pulses toward an underwater structure and a light detector that detects light that is reflected from the underwater structure;
a point cloud data storage that is in communication with the laser system for storing point cloud data that is autonomously generated in real time by the laser system; and
a data processor in communication with the point cloud data storage that processes first point cloud data from the data storage autonomously in real time, the data processor is configured to autonomously in real time to align data points in the first point cloud data to a pre-existing three dimensional virtual model of the underwater structure to estimate a position and orientation of the underwater vehicle relative to the underwater structure while navigating the moving underwater vehicle near the underwater structure and/or determine whether a structural change in the underwater structure has occurred.

12. The system of claim 11, wherein the moving underwater vehicle is one of an autonomous underwater vehicle, or a remotely operated underwater vehicle.

13. The system of claim 11, wherein the moving underwater vehicle comprises an autonomous underwater vehicle or a remotely operated underwater vehicle, the point cloud data storage and the data processor are on the underwater vehicle, and the underwater vehicle further includes a vehicle navigation system in communication with the data processor.

14. The system of claim 11, wherein the data processor and/or the point cloud data storage are at one or more locations separate from the underwater vehicle.

* * * * *